No. 815,227. PATENTED MAR. 13, 1906.
G. M. SPENCER.
AUTOMATIC REDUCTION AND QUICK ACTION TRIPLE VALVE.
APPLICATION FILED FEB. 15, 1904.
2 SHEETS—SHEET 1.
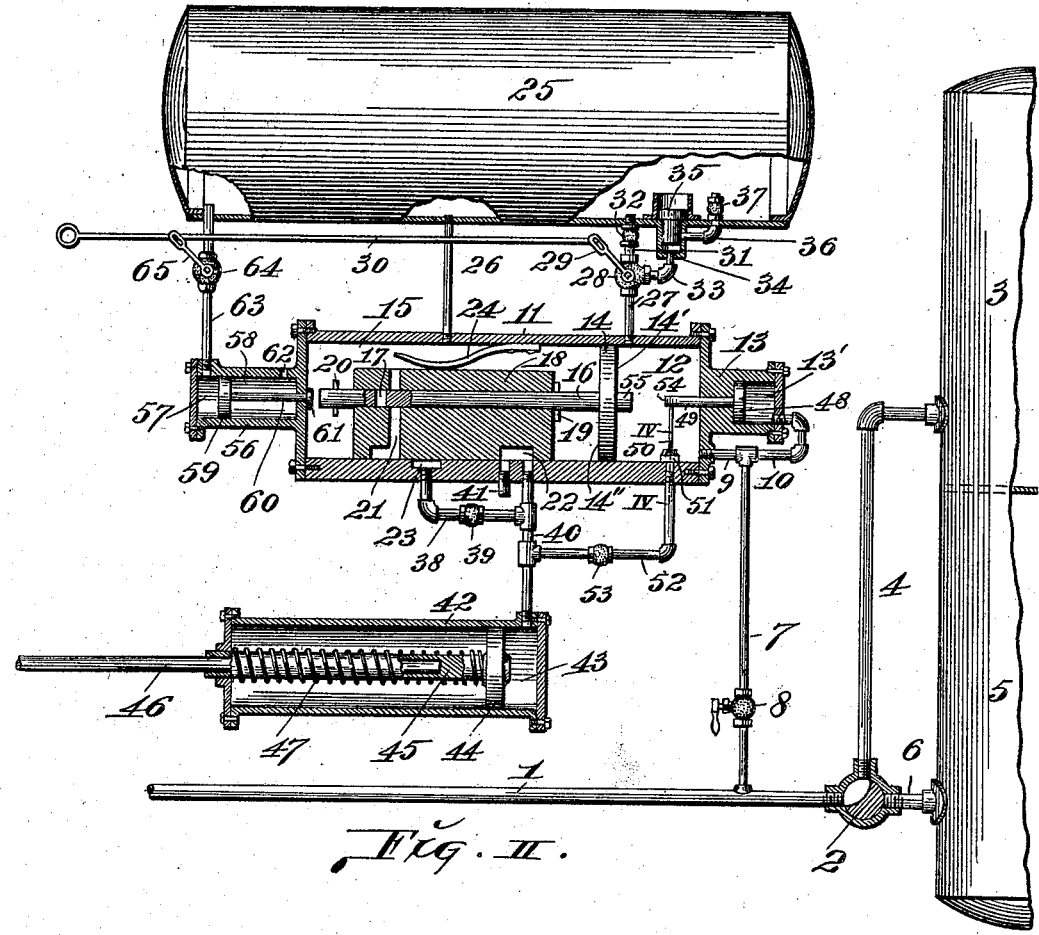
Fig. I.
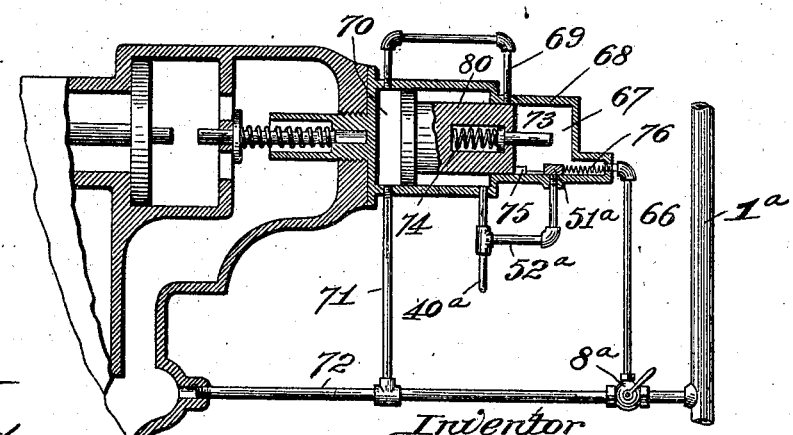
Fig. II.
Attest:—
M. P. Smith
Blanche Hogan
Inventor
Geo. M. Spencer.
By
Attys.

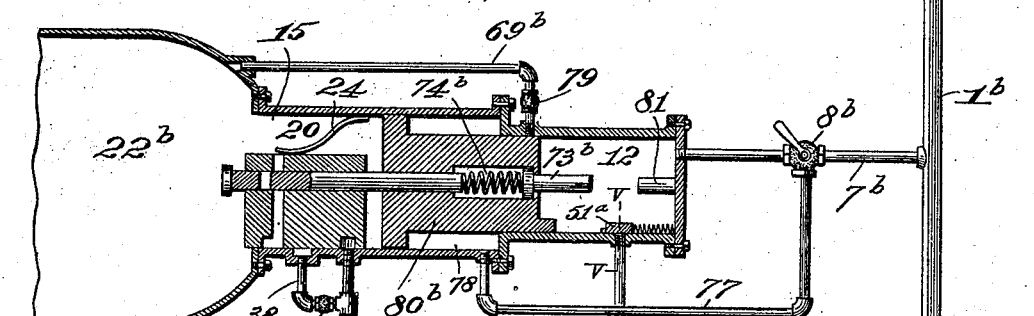

UNITED STATES PATENT OFFICE.

GEORGE M. SPENCER, OF ST. LOUIS, MISSOURI, ASSIGNOR OF ONE-HALF TO CHRISTOPHER J. GRELLNER, OF ST. LOUIS, MISSOURI.

AUTOMATIC REDUCTION AND QUICK-ACTION TRIPLE VALVE.

No. 815,227.      Specification of Letters Patent.      Patented March 13, 1906.

Application filed February 15, 1904. Serial No. 193,481.

*To all whom it may concern:*

Be it known that I, GEORGE M. SPENCER, a citizen of the United States, residing in the city of St. Louis and State of Missouri, have invented certain new and useful Improvements in Automatic Reduction and Quick-Action Triple Valves, of which the following is a full, clear, and exact description, reference being had to the accompanying drawings, forming part of this specification.

My invention relates to an automatic reduction and quick-action triple valve for air-brake systems; and it has for its object to furnish a construction by which different degrees of fluid-pressures may be secured to vary the braking forces in the system under different conditions by reducing the pressure action when used in connection with an unloaded or only partially-loaded car and whereby the pressure action may be increased to occasion greater braking force when used in connection with a loaded car.

The invention consists in features of novelty hereinafter fully described, and pointed out in the claims.

Figure I is a view, partly in plan and partly in horizontal section, of my triple valve in brake-system apparatus. Fig. II is a section illustrating a modified form of my invention shown in connection with a triple valve of what is known as the "Westinghouse" type. Fig. III is a modification of my valve in a system partly in plan and partly in horizontal section. Fig. IV is an enlarged section taken on line IV IV, Fig. I. Fig. V is an enlarged section taken on line V V, Fig. III.

1 designates a train or main supply pipe of a brake system which leads from an engineer's valve 2, which may be of any type in use on reduction air-brake systems. 3 is a main high-pressure storage-tank that is connected to the engineer's valve 2 by a pipe 4. The engineer's valve is also connected to a low-pressure storage-tank 5 by a pipe 6. The parts 5 and 6 are omitted when my entire system is not used.

7 designates a connecting-pipe leading from the train-pipe 1 and provided with a stop-cock 8. The connecting-pipe 7 is joined to branch pipes 9 and 10.

11 designates a triple-valve cylinder connected to a graduating-cylinder 13. In the triple-valve cylinder is a space 12, that has communication with the branch pipe 9. The branch pipe 10 has communication with the space 13' in the graduating-cylinder 13.

14 is a piston in the triple-valve cylinder, having a side face 14' facing the space 12. In the cylinder 11 is a space 15 at the opposite side of the piston 14 from that occupied by the space 12 and which is faced by a side face 14'' of said piston. The piston 14 is carried by a piston-rod or guide-rod 16, that contains a port 17.

18 designates a slide-valve through which the piston-rod 16 passes loosely. The movement of said piston-rod in the valve is limited by stops 19 and 20.

21 is a port extending through the slide-valve 18, with which the piston-rod port 17 is adapted to register.

22 is an exhaust-port in the slide-valve, and 23 is a port in the triple-valve cylinder with which the valve-port 21 is adapted to register.

24 is a spring that bears against the slide-valve 18 to hold it depressed to its seat in the cylinder 11.

25 designates an auxiliary tank, and 26 is a pipe connecting said auxiliary tank to the space 15 in the triple-valve cylinder.

27 designates a pipe leading from the space 12 in the triple-valve cylinder to a valve 28, that is provided with a lever 29, that is connected to an operating-rod 30.

31 is a pipe forming a continuation of the pipe 27 and leading from the two-way valve 28 to the auxiliary tank. In this pipe 31 is a check-valve 32.

33 is a branch pipe leading from the two-way valve 28, and 34 is a reduction-valve housing, in which is a two-faced reduction-piston 35, the upper end of which is of greater area than its lower end, as illustrated.

36 is a connecting-pipe leading from the reduction-valve housing to the auxiliary tank 25. This pipe leads into the auxiliary tank and it is provided with a forwardly-opening check-valve 37.

38 designates a pipe leading from the port 23 in the triple-valve cylinder, this pipe being provided with a check-valve 39.

40 is a pipe leading from the triple-valve cylinder and to which the pipe 38 is connected.

41 is an exhaust-pipe located in proximity to the pipe 40. The pipe 40 leads to a brake-cylinder 42 and communicates with a space 43 in said cylinder.

44 is a piston operating in the brake-cylinder and carrying a hollow piston-rod 45, in which is seated a solid piston-rod 46.

47 is a return-spring surrounding the piston-rod 45.

48 designates a piston operating in the space 13' in the graduating-cylinder 13. This piston is provided with a graduating-stem 49, that carries a valve-rod 50, to the lower end of which is fitted an emergency-valve 51. The valve 51 (see Figs. I and IV) rides in suitable guides and controls communication between the triple-valve-cylinder space 12 and the emergency-pipe 52, that leads to the pipe 40. In the emergency-pipe is a check-valve 53. The graduating-stem 49 is provided with a knob 54, that projects beyond the valve-rod 50 and faces a stem 55, projecting from the piston 14.

56 designates an assisting pressure-cylinder to aid the piston 14. This cylinder may be placed at any desired location. Its purpose is to assist the low pressure acting on 14. In this cylinder 56 are spaces 57 and 58, that are separated by a piston 59. The piston 59 carries a piston-rod 60, that operates through the adjacent head of the triple-valve cylinder and is provided with a knob-valve 61, positioned interior of the triple-valve cylinder in opposition to the piston-rod 16.

62 is a vent in the auxiliary cylinder 56, that has communication with the space 58 therein.

63 is a pipe leading from assisting-cylinder to the auxiliary tank 25. In this pipe is a one-way valve 64, that is provided with a lever 65, that is connected to the operating-rod 30.

In charging my system, as illustrated in Fig. I, the main storage-tank 3 (and storage-tank 5 if the entire system is used) is or are supplied with compressed fluid from any suitable source. If my entire system is used, the tank 5 is supplied with a lower pressure than the tank 3 is supplied, as above mentioned, from any available source. The compressed fluid passes from the storage-tank 3 through the pipe 4 to engineer's valve 2, the functions of which are to increase or diminish the pressure in train-pipe 1, to which is connected the pipe 7. When the stop-cock 8 is opened, the fluid will pass from the train-pipe 1 through pipes 7, 9, and 10 into spaces 12 and 13' in the triple-valve cylinder and the graduating-pressure cylinder to thereby act against the piston-face 14' and move the piston 14 toward the left. The pipe 27, leading from the triple-valve cylinder, is then opened. The two-way valve 28 being properly positioned, the fluid will pass therethrough and into the pipe 33 and enter the reduction-valve housing 34 to act on the lower end of the two-faced reduction-piston 35, having the two areas, as stated. This reduction-piston also acts as a cut-off. The fluid on entering the reduction-valve housing acts to raise the piston 35 therein, permitting flow of fluid from the housing 34 into the pipe 36, from which it escapes through the check-valve 37 into the auxiliary tank 25 if auxiliary tank 25 contains and is maintained at a lower pressure. The fluid acting now on the larger upper area, the piston 35 in the auxiliary tank will be forced into a position to close the end of the pipe 36, that enters the reduction-valve housing 34, thereby shutting off the passage of fluid through said pipe to the auxiliary tank. As a consequence the pressure in the auxiliary tank is maintained lower than the pressure in the train-pipe 1. It will be noticed that the piston in the reduction-valve housing is automatic in action and that if at any time the fluid-pressure becomes diminished in the auxiliary tank the piston of said valve will be moved into a position to permit communication through the pipe 36 to the auxiliary tank for replenishment of the supply in said tank. Should it be desired to charge the auxiliary tank with a pressure equal to the train-pipe pressure, the two-way valve 28 may be opened into a position to furnish communication directly through said valve to the auxiliary tank through the check-valve 32. In this instance the valve 64 should be closed, cutting out cylinder 56. The fluid in the auxiliary tank passes through the pipe 26 into the space 15 of the triple-valve cylinder 11, in which the fluid acts against the side face 14'' of the piston 14, as train-line pressure is acting on opposite side of said piston. It is obvious that if the resistance on either side of said piston 14 be different the piston will move in the direction of the least resistance. Therefore if resistance be correspondingly less in the auxiliary tank and triple-valve-cylinder space 15 the piston will move toward the left and increase the space 12 in the triple-valve cylinder. Communication is thereby opened through pipe 27 and valve 28 either through reduction-housing or direct to auxiliary cylinder 25, thereby maintaining communication between spaces 12 and 15, so that the fluid will act on piston-faces 14' and 14'' to regulate pressure in cylinder 25. Now if fluid passes through reduction-valve into auxiliary tank, which would also reduce the resistance against piston 14 on the left side, the greater resistance in the space 12 would keep the piston firmly to the left, and no regulation could occur to overcome this difficulty. When corresponding pressure is used, we bring into service the assisting-pressure cylinder, thereby equalizing the resistance, and when equal pressure is used said cylinder is cut out by the closing of the valve 64 in the pipe 63.

As there are several ways of constructing my automatic quick-action and reduction triple valve without deviating from the novel features of my invention, I show three forms, (illustrated in Figs. I, II, and III,) the description just given applying to that illustrated in Fig. I.

In the operation of the system as shown in Fig. I to set the brakes by what is known as a "service-stop" the procedure is as follows: A small and gradual reduction being made in cylinder-space 12 by reduction in train-pipe from any cause, the piston 14 is permitted to move to the right, and the piston-stem 54 and knob 55 meet and under slight reduction can move no farther, but by greater and quicker reduction will cause movement of the graduating-stem 49 and piston 48 of the graduating-cylinder 13, thus allowing the piston 14 to move farther to the right in making what is termed an "emergency-stop." When slight reduction is made, the piston 14 moves to the right, bringing the piston-rod port 17 to preliminary port 21 in the valve 18 and causing the stop 20, carried by said piston-rod, to engage the slide-valve and carry it into such a position that the preliminary port will register with the port 23, thereby placing the pipe 38 into communication with said preliminary port. The fluid will then pass through said pipe and the check-valve 39 and 40, respectively, and enter the brake-cylinder space 43 to act on the piston 44 in said cylinder and press its piston-rods forward, thereby compressing the spring 47. In releasing brake-pressure is restored to the triple-valve-cylinder space 12 to cause the return of the piston 14 toward the left, and thereby move the slide-valve in a corresponding direction, closing the ports 23 and 21 and moving the port 22 in the slide-valve into registration with the pipes 40 and 41, so that fluid will exhaust through said pipes from the brake-cylinder to the atmosphere. When this action occurs, the piston 14 also opens connections with pipe 27, which is connected to auxiliary cylinder 25, and will supply auxiliary cylinder with amount which has been withdrawn therefrom in operation described. The spring 47 then returns the brake-cylinder piston to its former position. To operate for emergency-stop, a quick and greater reduction is made in triple-valve-cylinder space 12, thereby causing the piston 14 to move farther to the right with rapidity, so that the piston-stem 55 and the piston-rod knob 54 will be brought into engagement, and with this extra force the stem 55 presses against knob 54 and causes the emergency-valve 51 to be moved away from the entrance to the pipe 52, that leads to the brake-cylinder-connecting pipe 40. In this operation the remainder of the valves are operated the same as in the former stop. The result then is that the train-pipe pressure in cylinder-space 12 is permitted to reach through the pipe 52 and check-valve 53 to the pipe 40 and the brake-cylinder space 43 and mix with the auxiliary pressure in said pipe and cylinder, thereby reducing the pressure quickly in the train-pipe and causing the next unit of the system connected to act quickly, and so on throughout the system units of a train. This is what is termed the "quick action." Also in securing quick action in this manner I utilize the fluid-pressure from the train-pipe, which can, if desired, be instantly blown to the atmosphere. If low pressure of fluid is used in the system, the only change that is made is to bring the secondary or low-pressure-assisting cylinder 56, its piston 59, piston-rod 60, and knob-valve 61 into service to receive and be actuated by fluid-pressure from the auxiliary tank passing through the pipe 63 and valve 64 into cylinder-space 57 to assist the low pressure, as before described. To change the system to operate from high to low pressure, the only action necessary is to move the valve-operating rod 30 to actuate the valves 28 and 64. Thus if high pressure is used both valves are illustrated; but if low pressure is used the valve 64 is opened, and the valve 28 is opened into a position to switch the fluid into the reducing-valve housing 34 to act against the double-area piston 35 therein. It is noted that I produce a preliminary movement in my system occasioned in the following manner: The piston-rod 16 is moved in the slide-valve 18 to open and close the ports 17 and 21 without moving the slide-valve. There are two objects in this movement—first, if the slide-valve is in the released position in which it is shown in Fig. I it will allow a sliding movement of the piston 14 in either direction without moving slide-valve 18—that is to say, as great a distance as stops 19 and 20 will permit without engaging the slide-valve. This movement happens in the existence of leakage either in train-pipe, auxiliary tank, or triple valve. Second, when the slide-valve is moved to service-stop position the piston 14 may close the ports 17 and 21, as the pressure has expanded into the brake-cylinder without moving the slide-valve. In this event the valve would remain in service position and the flow of fluid would be checked to the brake-cylinder through the ports 17 and 21. As a consequence the pressure is held in the brake-cylinder, and if it is desired to set the brakes a little firmer another slight reduction of train-pipe pressure will cause the piston 14 to move slightly to the right again, placing the ports 17 and 21 together. Therefore the flow of fluid from the auxiliary tank to the brake-cylinder will continue until expanded slightly below the train-pressure. This action may be repeated until the auxiliary-tank pressure and brake-pressure are equalized, thus furnishing the full limit of brake-power. In emergency-stop by mixing train-pipe and auxiliary pressure the braking force is increased about twenty per cent., and thus I utilize a pressure which in some systems is lost—i. e., it is discharged to the atmosphere.

In Fig. II, I have shown the system consolidated with a triple valve of the Westinghouse type. I wish to state that it may be combined with any other type of triple valve now in use, and I am aware that there are many modes of attaching my systems to said valve, though but a single method is shown in Fig. II. The operation in this construction is as follows: The storage-tanks and train-pipe are similar to those referred to in my system, Fig. I, with the exceptions that will be noted. $1^a$ is the train-pipe, and $8^a$ is a two-way cock by which the flow of fluid is controlled to place my system in communication with the triple valve to cut the entire system out or switch the fluid throughout system. The fluid passes from the train-pipe through the cock $8^a$ into pipe 66, and therefrom into the space 67 of the piston-cylinder 68 to act against the small end of the two-faced piston 80, thereby moving said piston toward the left and opening communication into the pipe 69, so that the fluid will pass from the space 67 into the space 70 and from said space through the pipes 71 and 72 to the triple valve, where it is used according to usual custom. It will be seen that the two-faced piston 80 has different areas, and it performs the function of the reducing-valve for controlling the flow of fluid through the pipes 69 and 71 and 72 to the triple valve. It is plain that a smaller pressure acting on a larger face will equal the high pressure on a smaller face, and fluid will be kept proportionally different in pressure to the different areas of the piston-faces. The operation in this construction to set the brakes for service-stop is as follows: I make the regular reduction as before described, thus allowing the piston 80 to move to the right until the stem 73 in the piston strikes the cylinder-head, toward which it moves, and the piston under a slight reduction can then move no farther. When this action occurs, the fluid from the triple valve is withdrawn through the pipes 72 and 71 into the cylinder-space 70 proportionately according to the amount of reduction occasioned in the cylinder-space 67, thereby producing the same effect on the triple-valve as though the reduction were made direct from train-pipe. To release the brakes, I restore the pressure to the cylinder-space 67, thereby causing the piston 80 to move to the left, compressing the fluid out of the space 70 into triple valve and opening connection through the pipes 69, 71, and 72 to the triple valve, thereby restoring what fluid has been used. Quick action and a quicker and greater reduction is thus made. The piston 80 moves to the right with rapidity and force, so that when the stem 73 comes in contact with the cylinder-head the spring 74 at the rear of said stem is compressed, thereby allowing the piston to move farther to the right and moving the piston-carrying projection 75 to the emergency-valve $51^a$ against the action of the spring 76. The emergency-pipe $52^a$ is thereby placed in communication with the cylinder-space 67, and the train-line pressure in said cylinder-space is permitted to pass through said pipe to the pipe $40^a$, leading to the brake-cylinder or to atmosphere or otherwise. This operation also causes the fluid to be withdrawn from the triple valve into the cylinder-space 70. If piston 80 moves to the right, space 70 is increased. The pressure is reduced in triple valve in proportion, thereby effecting a greater reduction in the triple valve, causing it to make its regular emergency movement. To release the brakes, pressure is restored into the cylinder-space 67 to cause the piston 80 to be moved to the left, thereby compressing the fluid in the cylinder-space 70 and forcing it into the triple valve through the pipes 71 and 72, also opening connection through the pipe 69 to the cylinder-space 70 and therefrom to the triple valve, when the pressure is restored. It will be seen that my system acts as an intermediate or means of communication between the train-pipe and triple valve, pulsating with each movement of train-pipe pressure, also causing triple valve to follow the same movement while receiving pressure from the fluid or train pipe and performing the same operative functions and causing the triple valve to follow the same and that I deliver the fluid to the triple valve at a lower pressure than that in the train-pipe.

Fig. III illustrates a varied form of the construction of my system in which the same principle is utilized and the same functions suitably performed, though the construction of the parts is somewhat dissimilar. In this form I combine the operating-piston 14 and reduction-valve 35, thereby producing a piston $80^b$ that by its peculiar shape performs the functions of the reduction-valve and assisting-pistons, assisting-cylinder 56 and ports associated therewith, whereby I am enabled to receive fluid and reduce and deliver it at a lower pressure. By this arrangement I am also able to set and release the brakes all in harmony and in connection with a single train-pipe. The system can be operated in connection with systems now in use and controlled and supplied from the same force now used. Also by changing the flow of fluid I can receive and control an equal pressure on an entire system. In connection with Fig. III, I will note that the double or greater area piston $80^b$, being constructed similar to that 80 in Fig. II, performs the same functions as the piston 80, with the following in addition thereto. By adding a pipe 77, connected to the triple-valve-cylinder space 78 and pipe $7^b$ by the valve $8^b$, pressure is admitted to said cylinder-space to act against the balance of the piston $80^b$ that is not acted upon in the cylinder-space 12. Now if pressure is applied in the cylinder-spaces 12 and 78 the resistance on such faces of the piston is equal to 15, thus making a reducing, controlling, and regulating valve out of said piston. Also when the pipe 77 is disconnected and the triple valve therefor disconnected it should have a suitable vent where convenient in order to vent the cylinder-space 78, so that it will operate to the atmosphere to prevent vacuum. The operation of the system as shown in Fig. III is comparatively the same as that shown in Figs. I and II, with the slight differences that will appear in the following: To charge the system as illustrated in Fig. III, if it is desired to operate with a lower pressure than that in the train-pipe, the same connections are made to the triple-valve cylinder with respect to the emergency-valve and train-pipe as that before described. The pipe $7^b$ connects with the two-way valve $8^b$, which is turned into a position to shut off the pipe 77 and vent the cylinder-space 78. The fluid now passes directly from the train-pipe to the cylinder-space 12, and therefore acts on the piston $80^b$, moving it toward the left. The pipe $69^b$ is thereby placed in communication with the space 12 to permit passage through the check-valve 79 to the auxiliary tank $22^b$ at a pressure lower in proportion to the areas of the piston $80^b$ in the spaces 12 and 15. The remainder of the operation in setting the brakes is the same as that before described. To charge the system with pressure equal to that of the train-pipe, the two-way valve $8^b$ is positioned to connect the pipe $7^b$ with the cylinder-space 12 and said pipe with the pipe 77 and cylinder-space 78. Therefore the fluid acting in the spaces 12 and 78 on the piston $80^b$ will act to move said piston to the left, as before, thereby making the same connections to the auxiliary tank; but the pressure must be equal before the supply can be shut off. The spring 24 is only of service when the triple valve contains no pressure. The stem 81, projecting from the cylinder-head in the space 12, is of service to cause gradual operation of the piston-carrying stem $73^b$, backed by the spring $74^b$. In Fig. I, I show graduating-stem controlled by pressure, while in Figs. II and III, I show a spring.

The advantages of my invention are that I am enabled to operate in a train of cars different pressures, thus applying different braking forces under varying conditions—as, for illustration, a heavy braking force to a loaded car of great weight and by lower pressure a sufficiently less braking force for empty cars carrying same equipments as for load. As the systems now in use apply the same braking force for loaded cars and empty cars, it is plain that with the empty cars as at present in use, weighing about thirty thousand pounds, the difference will be about one hundred and ten thousand pounds when the cars are loaded to their capacity. Now if the same braking force is applied to both empty and loaded cars it will be seen that the one will receive too much and the other entirely too little braking force. By adding assisting-cylinder and reducing-valve varied pressure can be operated. By my system I apply proper forces for both loaded, intermediates, and empty cars through the same equipments and from the same source of supply and control. By using lower pressure I save a great amount of compressed fluid, with resultant economy. Also if a few of the cars carrying a reduced pressure are scattered through a train of cars it will assist in quick action in case of emergency, for the principal feature in making quick action is the quick reduction of train-pipe which extends from engine to extreme end of fluid-circuit of brake system and holds brakes off. If engineer has to blow out the pressure at engine, too much time is consumed for efficient action; but by having a few low-pressure-equipped cars, and as the emergency connects train-pipe to brake-cylinder, I withdraw from train-pipe, thus securing rapid reduction and throwing all triple valves into quick action immediately, and if other types are in use in a train the advantages will benefit all, also utilizing the pressure from train-pipe that would be necessary to blow to atmosphere.

If my system is used complete, by using two or more tanks the amount of compressed fluid that is blown out to reduce train-pipe can be blown into low-pressure tank 2 or to a vacuum-chamber using the same fluid over and over at a considerable pressure, thereby making a great saving. Also I overcome difficulties which I find in other systems using a feed-groove over or through triple pistons. Inasmuch as if a very slow reduction should be made in the train-pipe, the auxiliary pressure will feed out from auxiliary into train-pipe through feed-grooves without moving the triple piston. Consequently inaction of brakes could occur, as all ports will be closed as if in released position. In my system this is impossible to occur, as by my auxiliary feed as soon as fluid passes from triple to auxiliary it is checked, and therefore it is impossible for it to return by the same way. Also my brake-cylinder always stands open to atmosphere when released. No danger, therefore, of application of brakes by leakages. When attached to a triple valve, particularly to a Westinghouse plain type of triple valve, I convert it to a quick action and also cause it to perform all of the above-named functions.

It will be seen, as in Fig. I, that the entire system is devoid of springs and packings.

My slide-valve is all in one piece, therefore less liable to leakage or sticking. The great difficulty in present systems is making emergency stop when service stop is wanted. This is done by slightly too quick a reduction in train-pipe, thus allowing triple-valve piston to move too quickly, compressing graduating spring, thereby causing quick action. This I prevent by holding the graduating-stem in place by pressure, as shown in Fig. I, which by a slight reduction (either quick or slow) the stem will have plenty of resistance to retain its position; but by a greater reduction the resistance becomes less, hence the easier to make a quick action when desired and one much less liable to do so when not wanted, although the spring adjustment can be used, if desired.

I can arrange to handle more than two pressures; but I only show how two can be handled. When this is done, the indicator-rod can be connected and is to be operated from any point suitable or practical on the car. For instance, if it be connected to the angle-cock of the system there will be no danger of overlooking to set it, as the angle-cock must be set when connected with the air-circuit. In making my emergency application it will be seen that I open a direct route from train-pipe to brake-cylinder. Other systems must seat and unseat a number of valves and compress a number of springs. Hence it will be seen that with my system the danger of valves sticking is avoided. If cars of present equipment are idle for some time, there is a chance for the mechanism and parts of triple valve to rust, &c., and the more parts and pieces the greater the liability of rust, gumming, &c. As my system has but few parts and these are pulled or pushed by pressure, interference with their operation cannot likely occur.

I claim as my invention—

1. A fluid-pressure brake system consisting of a series of units and having means including an assisting-cylinder and a piston therein for producing two different pressures of fluid and utilizing said pressures for controlling the operation of the various units of the system independently, substantially as set forth.

2. In a fluid-pressure brake system consisting of a series of units, the combination of a valve-housing, a valve in said housing provided with two or more ports, and means for controlling said ports in such manner as to utilize two different fluid-pressures for the operation of the various units of the system independently; said means including an auxiliary reservoir, and a plurality of communicating connections between said auxiliary reservoir and said valve-housing.

3. In a fluid-pressure brake system, the combination of a valve, means for controlling said valve, and a fluid-pressure-actuated graduating-stem performing the function of a valve to be actuated by said valve-controlling means solely through two separate flows of fluid, substantially as set forth.

4. In a fluid-pressure brake system, the combination of a valve, means for controlling said valve, and a fluid-pressure-actuated graduating-stem to be actuated by said valve-controlling means; said means and graduating-stem being controlled solely by separate flows of fluid-pressure, substantially as set forth.

5. In a fluid-pressure brake system, the combination of a controlling-valve cylinder, means for conducting a flow of fluid-pressure to said valve-cylinder, an auxiliary reservoir, means for furnishing communication between said valve-cylinder and reservoir, a reducing-valve located in said last-named means, valve mechanism in said controlling-valve cylinder, an assisting cylinder or cylinders, and a piston in said assisting-cylinder arranged to assist to actuate said controlling-valve mechanism, and means of communication between said auxiliary reservoir and assisting-cylinder, substantially as set forth.

6. In a fluid-pressure brake system, means for retaining and utilizing two or more different degrees of fluid-pressure of corresponding volume in separated parts of the system from a common auxiliary; substantially as set forth.

7. The combination with a brake-cylinder and a fluid-pressure-controlled valve, of means for conducting fluid under pressure to said valve, means for reducing the pressure of the fluid delivered to said valve, means for conducting the fluid of reduced pressure to said brake-cylinder, and means for changing the fluid from a reduced pressure to a higher pressure substantially as set forth.

8. A controlling-valve for fluid-pressure brake systems having means connected thereto for initially conducting fluid under pressure thereto, means for reducing said pressure, means for returning said fluid with reduced pressure to said valve, and means for changing the fluid from a reduced pressure to a higher pressure substantially as set forth.

9. In a fluid-pressure-brake system, the combination of a controlling-valve cylinder, a brake-cylinder, means of communication between said cylinders, a valve operating in said controlling-valve cylinder, means for supplying fluid under pressure to said controlling-valve cylinder, an auxiliary reservoir, means of communication between said controlling-valve cylinder, and auxiliary reservoir, a reducing means in said means of communication whereby the fluid passing to said reservoir is reduced in pressure to be returned to another portion of said controlling-valve cylinder, and means for changing the fluid from a reduced pressure to a higher pressure substantially as set forth.

10. In a fluid-pressure brake system, the combination of a brake-cylinder, a controlling-valve cylinder, means of communication between said cylinders, a valve in said controlling-valve, a piston having a means operating said valve, an assisting-cylinder, a piston in said assisting-cylinder having a rod arranged for engagement with said first-named piston-rod, an auxiliary reservoir having communication with said controlling-valve cylinder, and means of communication between said auxiliary reservoir and said assisting-cylinder, substantially as set forth.

11. The combination with a brake-cylinder and a fluid-pressure-controlled valve, of means for conducting fluid under pressure to said valve, means for reducing the pressure of the fluid delivered to said valve, means for conducting the fluid of reduced pressure to said brake-cylinder, means for changing the fluid from a reduced pressure to a higher pressure and means for receiving the fluid subsequent to its service in the brake-cylinder, for reuse, substantially as set forth.

In testimony whereof I have hereunto set my hand this 11th day of February, 1904.

GEORGE M. SPENCER.

In presence of—
  E. S. KNIGHT,
  NELLIE V. ALEXANDER.